(12) United States Patent
Javitt et al.

(10) Patent No.: US 6,381,055 B1
(45) Date of Patent: Apr. 30, 2002

(54) TRANSCEIVER POSITIONING IN FREE-SPACE OPTICAL NETWORKS

(75) Inventors: Joel I. Javitt, Hillside; Christopher Lee Rutledge, Somerset, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/061,534

(22) Filed: Apr. 16, 1998

(51) Int. Cl.[7] .............................................. H04B 10/00
(52) U.S. Cl. ........................ 359/159; 359/152; 359/169; 359/170
(58) Field of Search ................................ 359/152, 159, 359/169–170, 172

(56) References Cited

U.S. PATENT DOCUMENTS

| | | | | |
|---|---|---|---|---|
| 3,511,998 A | * | 5/1970 | Smokler | 359/159 |
| 3,566,126 A | * | 2/1971 | Lang et al. | 359/170 |
| 5,121,242 A | * | 6/1992 | Kennedy | 359/152 |
| 5,142,400 A | * | 8/1992 | Solinsky | 359/159 |
| 5,390,040 A | * | 2/1995 | Mayeux | 359/152 |

* cited by examiner

*Primary Examiner*—Kinfe-Michael Negash

(57) ABSTRACT

Methods and apparatus for safe and reliable telecommunication using a telecommunication network that employs substantially unguided, free-space, point-to-point, electromagnetic radiation are provided. Most methods include the use of a retro-reflector near a transceiver assembly. The retro-reflector can be used to rapidly calibrate, align, and/or realign one or more assemblies by reflecting a beam of light back toward its source, providing an opportunity for optical detection of the reflected beam.

8 Claims, 5 Drawing Sheets

TRANSCEIVER POSITIONING IN FREE-SPACE OPTICAL NETWORKS

BACKGROUND OF THE INVENTION

This invention relates to free-space optical telecommunication networks, and more particularly to the calibration and positioning of transceivers and transceiver assemblies used in such networks.

Free-space optical telecommunication offers an attractive alternative to hard-wired or radio communication in certain situations. For example, a telecommunications services provider who wants to enter a new geographical area may have little or no hard-wired plant in that area and may wish to avoid the cost and complexity of installing such plant to serve the new area. Similarly, radio communications resources are limited and regulated, and a new telecommunications services provider may not have sufficient rights to use those resources in a new geographical area.

Free-space optical telecommunication is therefore attractive because it avoids the need for hard-wired plant and because, unlike radio telecommunication, it is essentially unregulated. Optical telecommunication also has the advantage of very large information capacity. Thus optical telecommunications links can support a wide range of telecommunications services such as telephone, video, audio, and computer data transmission.

As described in commonly owned, co-pending U.S. application Ser. No. 08/847,196, filed May. 1, 1997, which is hereby incorporated by reference herein, free-space optical networks may employ substantially unguided, point-to-point, electromagnetic communication between area access points and end users. For example, an area may be served by one or more area access points, each having a transceiver for bi-directional, free-space, line-of-sight, electromagnetic communication with one or more nearby relay points. Relay points have at least two, and in some cases-more than two, free-space optical transceiver assemblies for line-of-sight optical communication with area access points, relay points, and/or end points. An end point is similar to a rely point except that an end point has only one transceiver. Relay point and end point transceivers may be located on the roofs of houses or other buildings in the neighborhood served by an above-mentioned area access point. Users of the network may be located at or near any relay point or end point.

Preferably, at least a fraction of the relay points are reachable via more than one path through the network of relay points for providing alternative communication between two points when direct service is undesired or temporarily unavailable.

A possible problem with providing alternative communication paths involves the calibration and alignment of transceiver assemblies during reconfiguration. For example, if communication between two points is temporarily interrupted, both points must normally reestablish communication with an alternative relay or access point. However, reestablishing communication may be problematic when information that indicates the alternative point's position is even slightly inaccurate, or when the positioning system itself has inaccuracies.

In fact, the problems associated with reestablishing communication between assemblies are compounded by the fact that both light beams must be aligned in order to establish two-way communication. For example, if the number of possible linking directions associated with a single assembly is represented by the variable N, then the time it takes to find one particular linking direction increases as N increases. It follows that the time it takes for two assemblies to independently find linking directions increases with the square of N. Of course, the number of possible linking directions scales with the solid angle in which the counterpart assembly is located. However, the number of possible linking directions (e.g., $N^2$) associated with two assemblies could become so large that a search for a particular linking direction may become impractically slow.

Therefore, it would be desirable to provide a free-space optical network that can be reconfigured quickly. In particular, it would be desirable to provide a network that could be reconfigured in a time that does not scale as the square of N, even when a relay point or an end point has limited or no knowledge regarding the positions of the alternative points.

Another possible problem of such networks involves safety. Some free-space optical networks could, under certain circumstances, be a direct ocular viewing hazard. For example, in a reconfigurable network, the vertical height of the transceiver assembly and the direction of an electromagnetic beam emitted by the transceiver are adjustable for finding alternative relay, access, or end points. Normally, such alternatives are found using a scanning routine. However, a person may be located in the path of the beam during scanning, which may damage that person's eyes.

Therefore, it would be desirable to provide a free-space line-of-sight optical network that can be reconfigured safely.

Yet another possible problem associated with free-space, line-of-sight, optical communication involves misalignment. For example, if a transceiver assembly at a relay point were mounted to a roof of a home, the position of that assembly may move when the position of the home moves. Such movement is known to occur periodically with temperature changes that accompany the change of seasons and continuously over a period of many years because the foundation of the home may settle over time. When the position or direction of an assembly changes relative to its counterpart assembly, communication therebetween may degrade, or even be lost, especially when the distance between the assemblies is large and/or the diameter of the optical beam carrying the information is small.

Another problem associated with free-space optical communication involves inaccuracies in the positioning system due to intermittent mechanical slippage and loss of positional data. This problem is compounded by the fact that both beams must be aligned.

Therefore, it would be desirable to provide a reconfigurable, free-space, line-of-sight optical network that is immune to misalignment. In view of the foregoing, it is an object of this invention to provide improved free-space, point-to-point, optical telecommunication.

It is a more particular object of this invention to provide safe, reliable, and accurate telecommunication using a telecommunication network that employs substantially unguided, free-space, electromagnetic radiation between spatially distributed points, even when a particular telecommunications pathway of the network is nonfunctional.

It is another particular object of this invention to provide accurate calibration and rapid alignment and realignment of transceiver assemblies mounted at access, relay, and end points.

SUMMARY OF THE INVENTION

These and other objects of the invention are accomplished in accordance with the principles of the invention by providing free-space optical telecommunications methods and apparatus that employs substantially unguided, point-to-point, free-space, electromagnetic communication between transceiver assemblies located at end points, relay points, and access points.

For example, in one embodiment of this invention, a self-calibrating, reconfigurable free-space optical transceiver assembly is provided that includes a transceiver, a calibration retro-reflector, and a control unit. The transceiver should be at least rotatable about a vertical axis and include a transmitter and a receiver. The transceiver should face the vertical axis and the retro-reflector should be at a known rotary position with respect to the transceiver. The control unit moves the transmitter so that it emits a rotating electromagnetic beam. In operation, a portion of the beam is reflected by the retro-reflector when the transceiver faces the retro-reflector and the receiver detects that portion. Other methods and apparatus for calibrating a transceiver, which do not use a retro-reflector, are also provided.

The self-calibrating assembly may be calibrated according to the following method. In a first step, the height of the transceiver assembly is adjusted to about a predetermined vertical height. In a second step, the assembly is rotated about a vertical axis. And, in a third step, the direction of the transceiver is determined when a position detector detects that the assembly is in a predetermined rotary position. An alternative to adjusting the height of the transceiver assembly according to this invention is adjusting an elevation angle of the assembly to a predetermined elevation angle.

According to another aspect of the present invention, a reconfigurable free-space optical network is provided. The network includes at least a first transceiver assembly and a second transceiver assembly, each of which includes a transmitter, a receiver, and a retro-reflector. The first transmitter is for emitting a first beam and faces a first variable direction. Also, the first receiver and retro-reflector substantially face in that first variable direction. The first retro-reflector is located at a known relative position from the first receiver. Preferably, the first transmitter, receiver and retro-reflector are mounted near one another compared to the distance of the second transmitter assembly. In one preferred embodiment, the retro-reflector is mounted above the transmitter, which is mounted above the receiver. Then, the entire assembly is preferably mounted to a motorized platform that can rotate about a vertical axis and can adjust its elevation angle relative to that vertical axis or a horizontal plane. The second transceiver assembly also includes a second transmitter, a second receiver, and a second retro-reflector, all which face substantially in a second variable direction. The retro-reflectors may be used during reconfiguration.

Accordingly, a method of aligning a first optical transceiver assembly and a second optical transceiver assembly is provided. The method includes (1) providing a retro-reflector at a known relative position from the second assembly so that the retro-reflector is in a line-of-sight of the first assembly, (2) transmitting an electromagnetic beam from the first assembly in a search sector for locating the retro-reflector, (3) receiving at least a portion of the beam by the first assembly when the retro-reflector is located, and (4) orienting at least one of the assemblies in response to the receiving so that the assemblies are at least partially aligned.

In another embodiment, a method for rapidly reconfiguring a first assembly and a second assembly is provided. Each assembly has a transmitter and a receiver, as well as a corresponding retro-reflector that is mounted at a known position so that all three components face substantially in the one direction at any given moment, although that direction may change with as required. The method includes transmitting a first optical beam from the first assembly and a second optical beam from the second assembly. Then, both beams are scanned according to an organized search routine. In a third step, at least a portion of the first beam is received by the first assembly when the first beam is reflected by the second retro-reflector. This only occurs when the first receiver and first transmitter face the second retro-reflector, however small adjustments maybe necessary to optimize alignment and power received by each assembly. And, finally, scanning of the first beam is terminated in response to the receiving step. This ensures that the first beam substantially faces the second assembly until that second assembly finds the position of the first assembly.

In yet another embodiment, a method is provided for reconfiguring first and second assemblies in which the retro-reflector of each assembly points in a direction that is different from the direction of its respective transceiver (including a transmitter and a receiver). The method includes: (1) orienting a second retro-reflector to face substantially in the direction of the first transmitter; (2) scanning a first electromagnetic beam transmitted from the first transmitter; (3) receiving at least a portion of the first beam by the first assembly (e.g., first receiver) when the first beam is reflected by the second retro-reflector; (4) terminating the scanning in response to the receiving; (5) rotating the second assembly so that the second transmitter and the second receiver face substantially in the direction of the first assembly and the second retro-reflector faces in a direction which is not in the direction of the first assembly (e.g., such as in an opposite direction); (6) searching for the first beam with the second receiver until the second receiver receives the first electromagnetic beam; and (7) adjusting at least one of the directions of the first transmitter and the second receiver to maximize the beam intensity received at the second receiver.

A method for safely establishing and maintaining communication between a first optical transceiver assembly and a second optical transceiver assembly is also provided. In a first step, an electromagnetic beam, having a power level, is transmitted from the first assembly to the second assembly when the first assembly faces in a first assembly direction and the second assembly faces in a second direction. In a second step, the power level of the beam is monitored at the second assembly during the step of transmitting. In a third step, a change in said power level is detected. In the fourth step, a cause for the change is identified. And, in a fifth step, it is determined whether the identified cause necessitates adjusting an operational parameter. Examples of such parameters are the first and second assembly directions and the power level of the beam received at the second assembly.

Further features of the invention, its nature and various advantages, will be more apparent from the accompanying drawings and the following detailed description of the preferred embodiments.

DETAILED DESCRIPTION OF THE PREFERRED EMBODIMENTS

Figure 1:
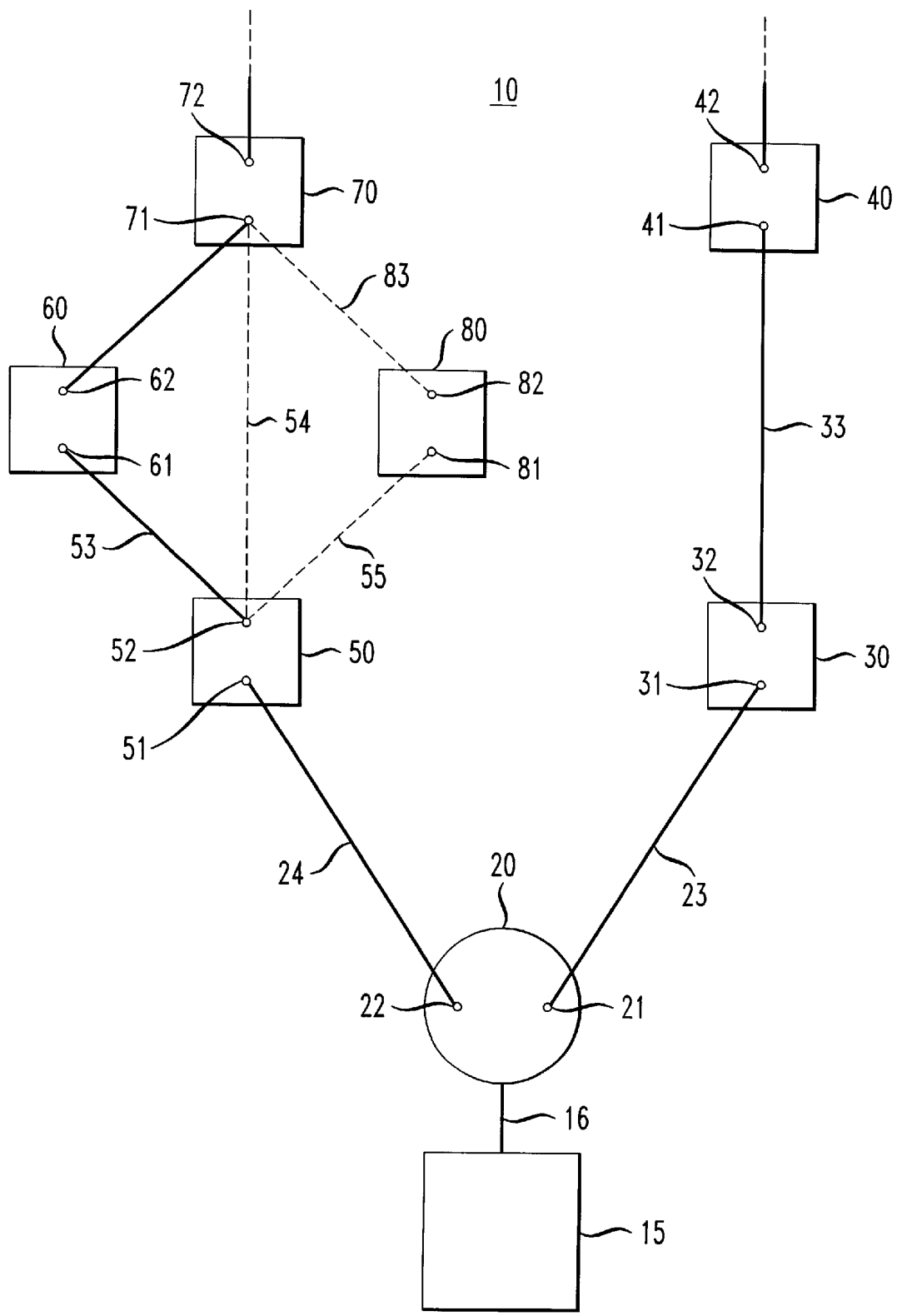
FIG. 1 is a simplified plan view of an illustrative installation of a network constructed in accordance with this invention.

FIG. 1 shows an illustrative area 10 served by a communications system constructed in accordance with this invention. Area 10 is accessed from area access point 20, which is positioned in or near area 10. Although more than one access point could serve area 10, only access point 20 is shown. Area access point 20 is connected to other external communications equipment 15 (e.g., the global telephone network, one or more sources of television programming, etc.) via a conventional connection 16 (e.g., an optical fiber and/or satellite link).

Access point 20 includes at least one (two in the depicted embodiment) free-space optical transceiver assemblies 21 and 22 mounted at a relatively high elevation to facilitate unobstructed, line-of-sight communication between (1) either transceiver assembly 21 and 22 and (2) another remote transceiver assembly. As shown in FIG. 1, assembly 21 is oriented to communicate with assembly 31 of relay point 30 along communication pathway 23, and assembly 22 is oriented to communicate with assembly 51 of relay point 50 along communication pathway 24.

Of course, because a network according to this invention is reconfigurable, either transceiver assembly 21 or 22 may be oriented to establish communication with other assemblies. As used herein, a "counterpart" assembly is one of a pair of assemblies between which direct communication exists. For example, assemblies 21 and 22 may be oriented to communicate with any of assemblies 31, 32, 41, 42, 51, 52, 61, 62, 71, 72, 81, and 82, provided those assemblies are located along an unobstructed line-of-sight and have a distance that is less than the maximum operating limits of either assembly. Also, as shown in FIG. 1, although assembly 52 has established communication with assembly 61 along communication path 53, assembly 52 may be reconfigured and aligned with another assembly, such as assemblies 71 or 81 along communication paths 54 or 55 (shown by dashed lines), respectively.

In addition to providing direct communication between points 50 and 70 along path 54, indirect communication may be provided via communication paths 55 and 83, via relay point 80. A person skilled in the art will appreciate that the number of possible indirect paths between any two points will scale with the number of available relay points in the network, which provides exceptional network flexibility.

In general, each user of communications services in area 10 is associated with one of the relay or end points. Conversely, each relay or end point generally has one or more users associated with it, although some relay points without users may be needed to reach users at more distant relay or end points. Preferably, communication equipment may be connected to any relay point for injecting and extracting data as desired.

Figure 2:
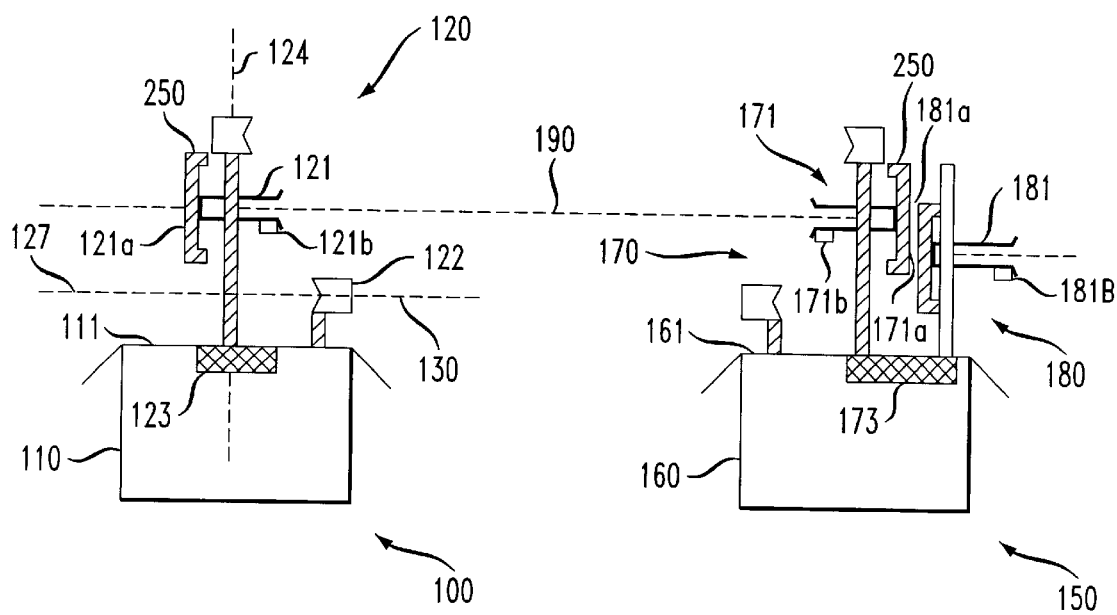
FIG. 2 is a side view of an illustrative embodiment of an end point and a relay point constructed in accordance with this invention.

FIG. 2 shows end point 100, which includes optical transceiver assembly 120 mounted on roof top 111 of building 110. FIG. 2 also shows relay point 150, which includes optical transceiver assemblies 170 and 180 mounted on roof top 161 of building 160. As shown in FIG. 2, free-space, optical communication may occurs between assembly 120 and assembly 170 along path 190. However, indirect communication between end point 100 and relay point 150 may also occur via other indirect communication paths as described above.

When it is determined that a transceiver assembly should change its counterpart, the network must reestablish one or more new communication paths. However, because transceiver assemblies will normally exist at relatively random locations in space, these communication paths may be difficult to find. Therefore, some positional information, such as a limited angular range, is preferably provided to the unmated searching assembly before it begins scanning. If that angular information is absolute, that is independent of arbitrary angular measurements, that assembly must have first been calibrated to an absolute standard. As used herein, a transceiver assembly is calibrated when its absolute direction is known. Once calibrated, the transceiver assembly can process the angular information provided to it and scan accordingly. An assembly can be calibrated once during its installation, or multiple times, such as before each reconfiguration.

Figure 3:
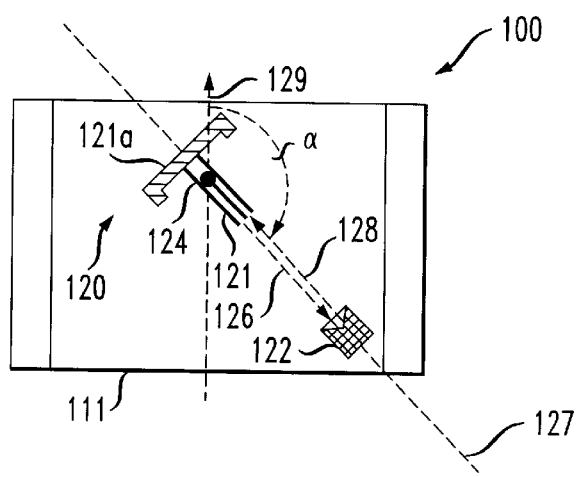
FIG. 3 is a plan view of the end point shown in FIG. 2 constructed in accordance with this invention.

FIGS. 2 and 3 show self-calibrating, reconfigurable free-space optical transceiver assembly 120. Assembly 120 includes transceiver 121, calibration retro-reflector 122, and control unit 123.

FIG. 3 shows that transceiver 121 is rotatable about vertical axis 124 and includes a transmitter for emitting an electromagnetic beam 126. The beam may be directed along substantially horizontal axis 127 or directed at some elevation angle above or below axis 127. Transceiver 121 also includes a receiver for detecting at least a portion of beam 128 after reflection by retro-reflector 122. Elevation angle may be used when transceiver 121 has no height adjustment capability. The wavelength of the beam is preferably between about 700 nanometers and about 1,550 nanometers, but may be any wavelength capable of forming a substantially columnated beam. Preferably, the beam is coherent (e.g., a laser beam).

In order to ensure reflection by calibration retro-reflector 122, retro-reflector 122 should substantially face vertical axis 124. Transceiver 121 must face retro-reflector 122 when transceiver 121 faces in a known rotary position α. As used herein, a retro-reflector, sometimes called a "corner-cube reflector," is a hollow reflective prism which redirects an incoming light beam back toward its source. Retro-reflectors that may be used with this invention are available from Opticon Corporation, of North Billerica, Massachusetts. Transceiver 121 may be in horizontal plane 130, which contains horizontal axis 127, or at an appropriate elevation angle that causes the beam to become incident on retro-reflector 122 at the predetermined angular position.

Control unit 123 is for positioning transceiver 121 so that retro-reflector 122 reflects beam 126 back towards transceiver 121 when horizontal axis 127 intersects with the position of calibration retro-reflector 122. This may involve rotating transceiver 121 about vertical axis 124 until transceiver 121 faces retro-reflector 122. If the vertical height of the horizontal plane 130 is unknown, transceiver assembly 120 may include an apparatus (not shown) for adjusting the height of transceiver 121 until a beam is reflected by retro-reflector 122.

A transceiver assembly may be calibrated according the following method. In a first step, the height or elevation angle (or both) of the assembly is adjusted to a predetermined vertical height or elevation angle, respectively. As shown in FIG. 2, for example, assembly 120 may be adjusted so that transceiver 121 of assembly 120 is in horizontal plane 130. In a second step, the assembly is rotated about a vertical axis. As shown in FIGS. 2 and 3, transceiver 121 may be rotated about vertical axis 124 thereby sweeping a beam. When the position, or at least the approximate position, of retro-reflector 122 is detected, the transceiver may be moved to that position first, and then rotated in a limited angular range known to include retro-reflector 122.

In a third step, the absolute direction of the calibrating assembly is determined when a position detector detects that the assembly is in a predetermined rotary position. As shown best in FIG. 3, the assembly direction is determined when a receiver of transceiver 121 detects reflected beam 128. This only occurs when assembly 120 points toward retro-reflector 122. The predetermined rotary position a is preferably an angular quantity measured from some known absolute direction 129, such as a northerly direction. In addition to rotary position α, elevation angle β is also preferably measured. Most preferably, both measurements are made when assembly 120 is installed.

An assembly may also be calibrated according to the principles of this invention without the use of a retro-reflector. For example, the predetermined position may be detected using an electrical detector or a magnetic detector. An electrical detector may include two electrical contacts, a current/voltage source, and a current detector. In this case, assembly 120 may be rotated about axis 124 until an electrical contact on the rotor of the assembly comes in contact with another stationary electrical contact. When the electrical contacts touch during rotation, an electrical current flows between the contacts and is detected by an electrical current meter. Alternatively, a magnetic detector may include a magnetic region and a magnetic field detector. In this case, assembly 120 may be rotated about axis 124 until a magnetic region mounted on the rotor of the assembly is detected by a stationary magnetic field detector, such as a Hall magnetometer. When the magnetic field produced by the magnetic region is detected, the assembly direction is determined to be in a predetermined direction. Of course, the positions of the magnetic region and the Hall magnetometer could be reversed.

Furthermore, an electrical, magnetic, or mechanical detector may be used in combination with the retro-reflector calibration method to speed up the calibration process. For example, a magnetic detector may be used to determine the approximate rotational position before the transceiver position is fine-tuned using the retro-reflector calibration method. Once the retro-reflector calibration process is complete, additional calibration may be performed with a multi-element photodetector array, such as a quad sensor (e.g., see FIG. 4).

Even if transceiver assemblies are not calibrated before being scanned, they can still be reconfigured in accordance with this invention. For example, a network according to this invention includes at least two assemblies. Each of the assemblies includes a transmitter, a receiver, and a retro-reflector (see FIG. 4), but as described more fully below, the retro-reflector in this embodiment is for alignment—not for calibration.

One transceiver that may be used in accordance with this invention is shown and described in U.S. patent application Ser. No. 08/818,690, filed Mar. 19, 1997 which is hereby incorporated by reference herein (see FIG. 4). Transceiver assembly 200 includes transceiver 231, which includes transmitter 202 and receiver 201. Receiver 201 is a photo-detector for detecting information-conveying light. Transceiver 200 also includes transmitter 202. Transmitter 202 transmits light along the same optical axis that is used for light received by receiver 201. A common optical axis may be desirable because alignment of counterpart assemblies is simplified.

Transceiver assembly 200 may include several other components. For example, transceiver assembly 200 may include position-sensing photo-detector array 210 (e.g., a quad sensor), which includes four separate elemental detectors 211, 212, 213, and 214. Photo-detector array 210 can detect the position of an incident beam and provide information necessary for accurate alignment. Also, transceiver assembly 200 may further include retro-reflector 220, which may be supported above transceiver 231 by brace 240. Brace 240 should be sufficiently long to prevent interference at receiver 201 due to light that is inadvertently reflected by a retro-reflector of a counterpart assembly during operation. Alternatively, interference at receiver 201 can be prevented by operating transmitter 202 at a wavelength that is different from the operational wavelength of receiver 201. When the operational wavelengths are different, one or more filters can be used to prevent interference at receiver 201 of transceiver assembly 200, which allows substantially interference-free communication, even when a common optical path is used.

Retro-reflector 220 of transceiver assembly 200 may be a single hollow retro-reflector device, as described above, or an array, or wall, of substantially similar devices, thereby increasing the reflectable surface area.

Furthermore, assembly 200 may include photo-detector 250, which may be mounted around outer circumference 232 of safety bonnet 231a for detecting physical obstructions and gross misalignment of the incident beam. Photo-detector includes one or more individual detectors 251, 252, 253, and 254.

In operation, the transmitter of each transceiver transmits a beam while scanning it through space. Simultaneously, preferably continuously, the receiver of the same assembly monitors for that beam. The receiver will receive that beam when reflected by the retro-reflector of the counterpart assembly. In order to improve the ability of the receiver to detect the reflected beam, the beam may be modulated in a predetermined fashion and the receiver may be likewise programmed to detect such modulation. Reflection occurs when the assemblies substantially face each other—that is, when one assembly points at the retro-reflector of its counterpart assembly.

The assemblies shown in FIG. 2 include at least one control unit that includes a programmable microprocessor (not shown) for controlling the scanning of at least one of the assemblies. Such control units may be local (units 123 and 173) or remote from their respective assemblies (such as when a single control unit controls multiple assemblies). In either case, however, the microprocessor of a first assembly may be programmed to scan a beam in space until a retro-reflector of a second assembly reflects a beam back towards a receiver of the first assembly.

Figure 5A:
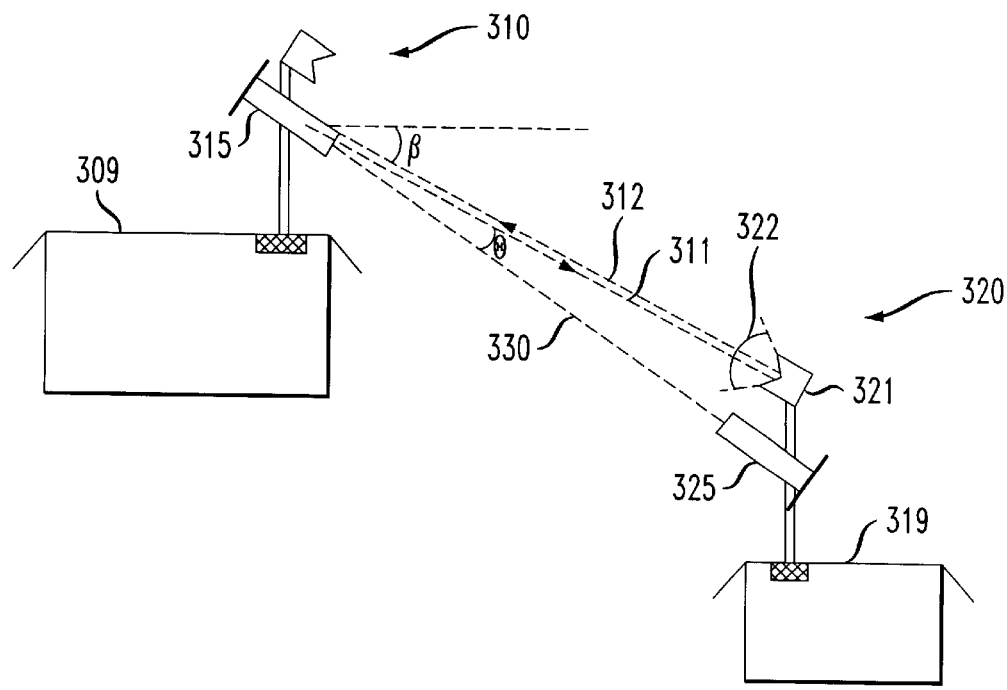
FIG. 5A is a side view of an illustrative embodiment of two transceiver assemblies constructed in accordance with this invention.

FIG. 5A shows two counterpart assemblies 310 and 320 mounted on structures 309 and 319, respectively. Assembly 310 at least includes transceiver 315. Counterpart assembly 320 includes transceiver 325 and retro-reflector 321, which is provided at a known relative position from transceiver 325. In order for assembly 310 to find assembly 320, retro-reflector 321 must be in a line-of-sight with transceiver 315. As used herein, the term "line-of-sight" means an unobstructed straight path along which two assemblies are capable of simultaneous optical communication. When beam 311 is transmitted by transceiver 315 and reflected by retro-reflector 321 to form reflected beam 312, assemblies 310 and 320 are substantially aligned. Because retro-reflector 321 is at a known relative position with respect to transceiver 325, transceiver 315 can be reoriented to precisely face transceiver 325, providing communication along path 330. When transceiver 325 is directly below retro-reflector 321, as shown in FIG. 5A, reorientation merely involves lowering transceiver 315.

If the network includes a common control unit, the method of this invention may include directing the second assembly to face the first assembly when the first assembly receives its own reflected beam. This directing step may simply involve stopping scanning of the second transceiver. This is because when the first assembly receives its own reflected beam, the second assembly will substantially face in the direction of the first assembly.

A network according to this invention may include a global positioning system ("GPS"), and possibly a differential GPS, for supplying the control unit the position data that relates to the exact or approximate positions of the assemblies. In a preferred embodiment of this invention, differential GPS is employed during installation of the assemblies to better determine the exact positions of the assemblies. That information could then be stored by a memory unit and used by a control unit.

In accordance with this invention, methods of aligning two optical transceiver assemblies, determining an assembly direction, safely maintaining communication between assemblies, and rapidly reconfiguring assemblies in a free-space optical network are provided.

An illustrative method of aligning two assemblies, such as assembly 310 and assembly 320 of FIG. 5A, is now described. In a first step, retro-reflector 321 is provided at a known relative position from assembly 320. In a second step, electromagnetic beam 311 is transmitted from assembly 310 toward retro-reflector 321. As described more fully below, this transmission is normally carried out during scanning of the beam until the beam is incident on retro-reflector 321. Preferably, retro-reflector 320 is provided in substantial vertical alignment with second transceiver 325. In this way, once beam 312 is received, transceiver 315 may simply raise or lower beam 311 until it is directed at transceiver 325, as shown by beam 330 in FIG. 5A. Therefore, vertical alignment of retro-reflector 321 and transceiver 325 facilitates simple and rapid orientation.

In a third step, at least a portion of beam 311 is received by a photo-detector (e.g., a receiver of first assembly 310) when (1) beam 311 is reflected by retro-reflector 321, thereby forming reflected beam 312, and (2) assembly 310 faces in a direction capable of receiving reflected beam 312. When assembly 310 faces that direction, it is in a linking direction. Reflected beam 312 will reflect from assembly 310 when beam 311 has an incident angle within acceptance cone 322 of retro-reflector 321. When this condition is satisfied, reflected beam 312 propagates in a direction opposite beam 311 (and usually slightly offset from beam 311). Each transceiver assembly has at least a transmitter and a receiver, preferably pointing in substantially the same direction. (For illustrative clarity, the transmitter and receiver of assemblies 310 and 320 are shown combined into transceivers 315 and 325, respectively.) Therefore, reflected beam 312 may be received by a receiver of assembly 310. However, beam 312 may also be detected by another photo-sensitive detector of assembly 310, such as a separate photo-detector.

In a fourth step, at least one of assemblies 310 and 320 is oriented in response to the receiving step so that assemblies 310 and 320 are at least partially aligned with each other. Orientation may simply involve stopping scanning of assembly 310 when beam 312 is received by that assembly, leaving assembly 310 facing assembly 320. Alternatively, or in combination, orientation may involve other steps, including orienting assembly 320 and/or notifying a system manager that a communication path has been established.

Orientation may include scanning beam 312 to find retro-reflector 321 of counterpart assembly 320. When first assembly 310 finds second assembly 320, second assembly 320 may not find first assembly 310. This can occur, for example, when the distance between a retro-reflector and its associated transceiver is relatively large, the receiver acceptance cone is relatively small, or when the scanning beam has a relatively small diameter or low intensity.

In order to overcome this problem, a control unit may be provided that can orient the position of the second assembly based on the known direction of the first assembly. For example, if the position and direction of assembly 310 is known when assembly 310 finds assembly 320, assembly 320 could be oriented to face assembly 310 if the position of that assembly is known. The positions of assemblies 310 and 320 can be determined, for example, with GPS technology and/or other information, such as information obtained during calibration.

A second assembly may be assisted in finding the first assembly by adding an additional retro-reflector to the first assembly. The additional retro-reflector faces substantially in the same direction as the first assembly. Then, the scanning step may include scanning the additional retro-reflector with the first assembly. In this way, the additional retro-reflector will reflect a beam back toward the second assembly when the retro-reflector of the second assembly reflects a beam toward the first assembly.

The term "scanning," as used herein, involves the process of varying the position or direction of any beam emitted from an assembly in a known, organized fashion. For example, scanning of a beam may be performed in two-dimensions by rotating a transmitter about a single axis or in three-dimensions by rotating a transmitter about an axis while raising or lowering it or by rotating it about two axes. Scanning may include continuous or periodic rotary movements and may be performed according to any programmed search routine. One example is a spiral routine involving rotation about a central axis while continuously receding from or approaching that axis. Another example is a matrix routine involving pointing toward a rectangular array of points sequentially in space by row, column, or any combination thereof. Scanning may also be performed over a limited angular range when such information is available to the control unit that manipulates or controls the direction of the assembly.

Alignment, according to this invention, may also include the step of calculating the position of the second transceiver. This calculating step is preferably performed by combining the known relative position of the second assembly with the linking direction of the first assembly. For example, when the first assembly finds the second assembly, the first assembly will be in known linking direction. At that moment, the beam is reflected by the retro-reflector of the second assembly and received by the receiver, or another photo-detector, of the first assembly. Then, readjustment of the direction of the first assembly may be required to optimize alignment between the assemblies. The calculating step may be performed by a control unit that controls the motion of one or more transceiver assemblies, locally or remotely, including the control of any sub-parts (such as the separate positioning of the transmitter or receiver). Feedback techniques may be employed to accurately steer the reflected beam toward an optimum receiving position during orientation.

In a preferred embodiment of this invention, two transceiver assemblies are aligned as follows. In a first step, the retro-reflectors of counterpart assemblies are oriented so that they substantially face their counterpart transmitters. This roughly aligns the assemblies so that the retro-reflectors reflects beams back toward their respective counterpart assembly. In a second step, test patterns are transmitted by both assemblies and reflected by their counterparts to confirm that the assemblies are properly matched. In a third step, a flight time is measured for determining the distance between counterpart assemblies. As used herein, the flight time is the period of time required for light to travel from one assembly, to its counterpart assembly, and back. Once that time period is measured, the distance between counterpart assemblies is easily calculated because separation distance $D_s$ equals flight time $t_f$ multiplied by speed of light $c_l$ divided by 2(where $c=3.0\times10^8$ meters/second). In a fourth step, the transmitter of each assembly is reoriented so that it faces its counterpart receiver.

The distance measurement based on flight time can also be used to confirm that two assemblies have been properly matched. For example, if a first assembly has information regarding the angular position of a second assembly, the first assembly can be oriented to face the second assembly. However, if a third assembly is located at substantially the same angle as the second assembly, the first assembly could distinguish the second and third assemblies by measuring the distance between the first assembly and the counterpart assembly. If the approximate distance between the desired counterpart assembly is known, the known distance can be compared to the measured distance to the counterpart assembly. Therefore, if the desired distance is similar to the measured one, it is possible to confirm that the counterpart assembly is the desired one and not the other assembly located at a similar angle.

As shown in FIG. 3, reorientation may simply involve adjusting elevation angle $\beta$ of transceiver 315 when the receiver of counterpart assembly 320 is located at fixed distance $D_f$ above or below the retro-reflector. The magnitude of the angular adjustment $\theta$ is approximately equal to $D_f$ divided by $D_s$ (assuming that $D_f\ll D_s$). When distance $D_s$ is not known, reorientation may simply involve adjusting elevation angle $\theta$ of one transmitter until the intensity of its beam is maximized at the counterpart receiver.

When scanning an electromagnetic beam in space, precautions must be taken to insure that the public is not exposed to a harmful dose of electromagnetic radiation. According to one aspect of the present invention, the public can be protected by scanning the beam under certain safety constraints. For example, it is well known that the maximum permissible exposure (hereinafter, "MPE") to a laser beam depends on the wavelength of the beam, the exposure duration, and the total energy or power density. For example, according to Table 5 of the American National Standard Z136.1-1993, published by the American National Standards Institute, the MPE for visible and near infrared radiation having a wavelength of between 0.400 microns and 0.700 microns, and having an energy density of about $10^{-2}$ Joules/cm$^2$, has a maximum exposure duration of about $10^4$ seconds. Table 5 also indicates that with increasing wavelength, maximum exposure durations and maximum permissible exposures generally increase. Another source of radiation safety standards is 21 C.F.R. § 1040.10, which among other things, classifies laser sources as a function of human accessible emission limits for laser radiation as a function of wavelength, emission duration, and power.

In order to comply with such standards, and in accordance with this invention, a transceiver assembly can be scanned safely when provided with a safety mode and a communication mode. As used herein, the "safety mode" of a transceiver assembly is considered activated when the radiation emitted by the transmitter of that assembly is in compliance with the above-identified safety standards (e.g., the MPE standards). In contrast to the safety mode,- and as also used herein, the "communication mode" is considered activated when the radiation emitted by that transmitter is sufficient for conveying information, but is not necessarily in compliance with those safety standards (e.g., MPE).

According to this aspect of the invention, the method of aligning two transceivers in a free-space optical network can be performed safely when the scanning step includes the following three steps. The first step involves activating the safety mode of the first assembly before scanning so that the beam emitted by that assembly has a maximum intensity (e.g., Watts/cm$^2$) and a minimum angular velocity (e.g., degrees/second) until the step of receiving. The second step involves deactivating the safety mode of the first assembly in response to the receiving step. The third step involves activating the communication mode of the first assembly.

The maximum intensity and minimum angular velocity of the beam for any given transmitted wavelength of radiation are easily calculated using the following method. According to the MPE standards set forth above, the surface of the eye should not be exposed to a dose of radiation of more than X Joules/cm$^2$ in t seconds,. Therefore, in order to ensure that a beam having a radiation intensity of I Watts/cm$^2$ and a diameter $D_b$ scanned at a rate of V cm/s does not provide a radiation dose exceeding the MPE standard, the minimum linear velocity of the beam $V_{min}=D_b*I/X$. If the beam has an intensity I at some distance, then the minimum angular velocity of transmission $\omega_{min}=2\pi V_{min}$. Similarly, the maximum intensity of a beam being scanned at any particular velocity V (cm/sec) is given by $I_{max}=x/t$, where $t=D_b/V$.

These calculations assume, however, that the beam is substantially columnated, which means that the cross-sectional area of the beam (e.g., $\pi(D_b/2)^2$) at any suitable position along the length of the beam does not substantially change (except attenuation due to atmospheric absorption). If the beam converges along its distance ($D_b$ decreases in the direction of propagation), maximum intensity $I_{max}$ decreases and minimum angular velocity $\omega^{min}$ increases. In the more likely event that the beam diverges during propagation, the maximum allowable intensity $I_{max}$ increases and the minimum angular velocity $\omega_{min}$ decreases.

A method according to this invention may further include additional steps after activating the communication mode of the first assembly. In a first step, physical motion, such as human activity, is monitored in a region with a motion detector positioned near the second assembly. For example, motion detectors 121b, 171b, and 231b are shown mounted to transceivers 121, 171, and 231 in FIGS. 2 and 4. In a second step, a signal is received from the motion detector when it detects motion in the region. And, in a third step, the communication mode of the first assembly is deactivated. The monitoring step may include monitoring the region adjacent the first and/or the second assembly, such as by using one or more microwave or infrared motion detectors. By deactivating the communication mode of the assembly when motion is detected in the region, the hazard associated with the transmission of the high intensity beams required to provide high bandwidth communication is largely eliminated.

Figure 4:
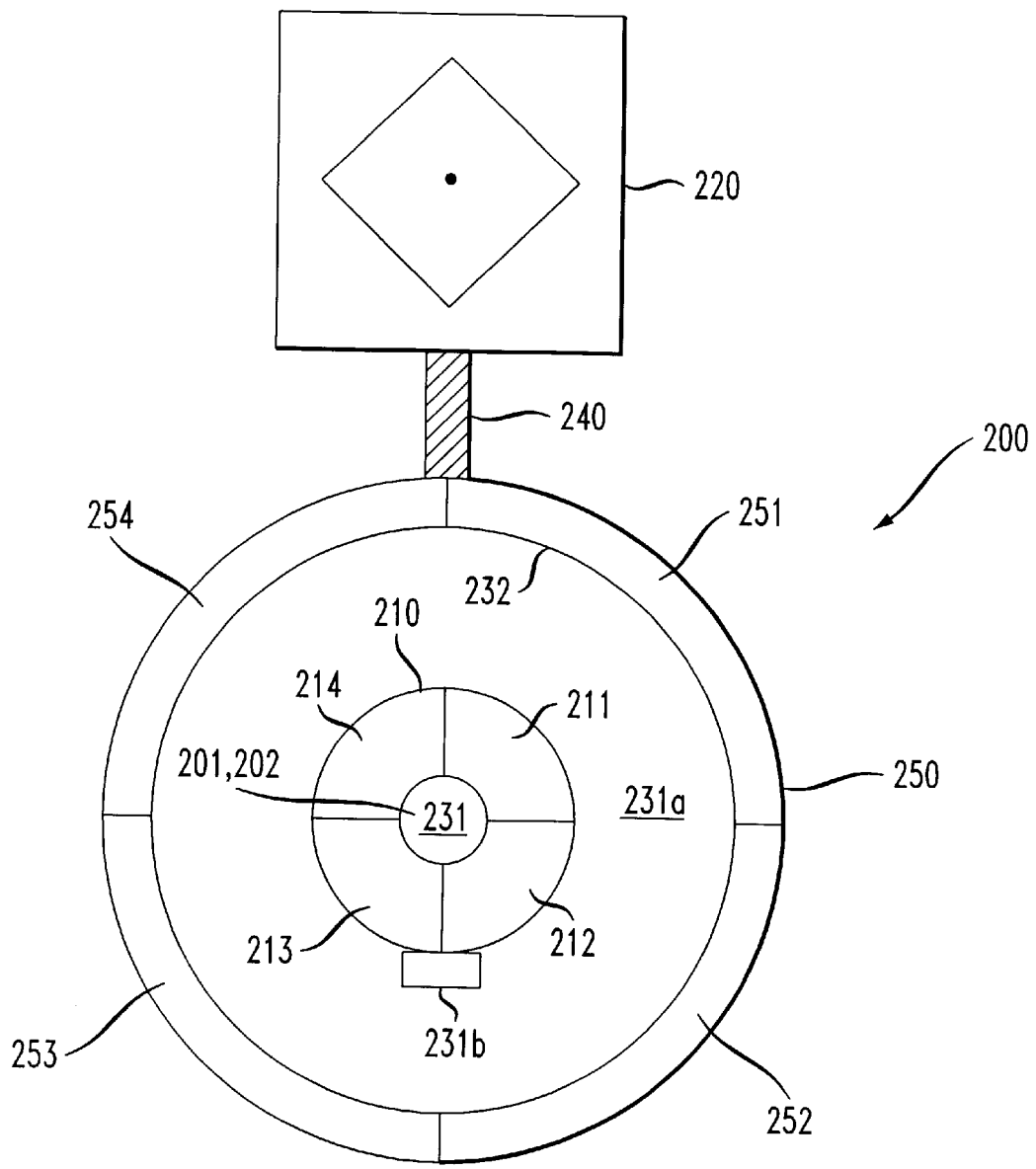
FIG. 4 is an axial view an illustrative embodiment of a transceiver assembly constructed in accordance with this invention.

Another method according to this invention involves the use of one or more safety bonnets. A safety bonnet may be mounted circumferentially around a transceiver in a transceiver assembly. For example, as shown in FIGS. 2, 3, and 4, safety bonnets 121a, 171a, 181a, and 231a are mounted circumferentially around transceivers 121, 171, 181, and 231, respectively. As used herein, a "safety bonnet" is any optically opaque object having a cross-sectional area sufficient to block any portion of a beam directed toward its transceiver assembly that is not absorbed or reflected by that assembly during operation. In the illustrative embodiments shown in FIGS. 2–4, a safety bonnet may include a flat plate. Preferably, the bonnet absorbs the beam or reflects it in a safe direction, such as in a upward or downward directions.

Safety bonnets are especially useful when the transceiver assembly is receiving a potentially hazardous, high intensity optical beam (such as when the assembly is receiving a beam from another assembly in its communication mode). Because the bonnet blocks any portion of the beam not being received by the assembly, the beam is not an ocular hazard beyond the bonnet. Also, the bonnet prevents the portion of the beam that is not received by the receiver of the assembly from interfering with communication of other assemblies.

According to yet another aspect of the present invention, a method for safely maintaining communication between a first optical transceiver assembly and a second optical transceiver assembly is provided. This method may be used in conjunction with a safety bonnet and/or with assemblies that have a safety mode, but may be practiced without these features as well. In a first step, an electromagnetic beam is transmitted from the first assembly to the second assembly. At this time, the first assembly points in a first direction and the second assembly points in a second direction. In a second step, the power level of the beam is monitored near, and preferably by, the second assembly. In a third step, a change in the power level is detected. In a fourth step, a cause for the change is identified. And, in a fifth step, it is determined whether the cause requires adjusting a parameter relating to the communication between the assemblies. Some parameters that may be adjusted according to this method include the first and second directions and the beam power level. It is possible that more than one parameter requires adjustment in combination, either sequentially or simultaneously.

In this method, the monitoring step may performed using a receiver of the second assembly. Alternatively, the monitoring may be performed by a separate photo-detector positioned near, and preferably circumferentially about, the second transceiver. One type is four quadrant detector array 210 that includes four symmetrically mounted detectors 211, 212, 213, and 214 of substantially equal surface area. By comparing the relative intensities measured by the individual detectors, it is easy to determine (1) the position of the incident beam on the second assembly and (2) any misalignment of the beam. The step of monitoring may be performed continuously or periodically.

A particularly useful quantity to monitor is the rate of change of beam power. For example, slow rates of change may indicate changes in the atmospheric conditions between the two transceivers. For example, it is well known that electromagnetic radiation is absorbed by air and that the degree of absorption depends on factors such as the atmospheric pressure, humidity, and the amount of precipitation and smog. Because these factors change relatively slowly, the degree of absorption and the power level incident at the second assembly will also change slowly. By monitoring the rate of change, it is therefore possible to attribute one or more causes to a particular type of change in power level.

In contrast to the relatively slow rates of change that normally accompany atmospheric changes, physical obstructions normally cause relatively rapid rates of change. For example, if a tree falls between two transceivers and blocks the transmission of a beam, the power level would change from an operational level to a non-operational level in less than a second, and most likely in less than a fraction of a second. Also, an obstruction tends to cause a drop in the average power level at the receiver (i.e., decrease in DC signal). In such a case, it might be desirable to reestablish communication by reconfiguring the network. When the power level suddenly drops, however, it may also be desirable to immediately reduce the power level of the beam below the MPE criteria described above, because the physical obstruction may be a human being. Such a reduction may be achieved by modulating the beam power with time, aperturing the beam at the first transceiver assembly to reduce the beam diameter, or reducing the energy density of the beam by adjusting the gain of the transmitter.

Scintillation and beam wander are two additional reasons that the power level measured at the receiver usually change with a characteristic frequency. Scintillation is the variation in the intensity of the signal received caused by changes in the transmission medium with time, such as the air temperature. It is perceived as a rapid fluctuation of amplitude and/or phase of the light wave, and usually changes at a rate of between about 10 Hz and about 200 Hz. Also, beam wander occurs when the edge of a light beam moves on and off of an active region of the detector, perhaps due to physical vibration of the transmitter or receiver. Normally, these frequencies occur below about 10 Hz and cause relatively small variations in the total power level. Because both types of effects cause the power level to vary in characteristic ways, these effects can be easily identified. Once identified, these effects can be compensated with electronics or neglected if small enough.

Yet another possible cause for changes in the power level is transceiver assembly misalignment. Misalignment may occur for a number of reasons. For example, a transceiver assembly according to this invention may be slowly misaligned due to the movement of a base (e.g., the roof of a home) that supports the assembly, such as due to a shift of the foundation of the home. Such misalignment would likely occur very slowly (e.g., seasonally). Therefore, any misalignment that occurs over very long periods of time would be identifiable by comparison with known seasonal trends or rates. Moreover, misalignment may also occur over shorter time periods (i.e., daily) due to diurnal shifting of the base. Such shifting results from thermal expansion and contraction due to the heat of the sun. Therefore, when the power level increases and decreases with a daily frequency, the changes can be identified as diurnal and either be corrected or neglected, depending on the magnitude of the changes the tolerance threshold of the communications equipment.

Yet another possible cause for beam power level changes is an instability in the power supply. Such changes could be rapid or slow (e.g., over fractions of a second or over the course of hours, or even days). One way of distinguishing power supply instabilities from physical obstructions and other causes is to monitor the power level at two locations simultaneously, such as at two photo-detectors (e.g., detectors 210 and 250 of FIG. 5A, or any subcombination of elemental detectors). Physical obstructions would be expected to cause changes in monitored beam power levels at different times because the obstruction must enter the beam from its side. Unlike physical obstructions, power instabilities would likely cause the power levels monitored at two or more detectors to change simultaneously. Therefore, by comparing the timing of the changes at both detectors, the cause of the change may be determined. If determined to be a power instability, the method of this invention may include the step of switching to a new power supply.

If it is determined that reconfiguration of two or more assemblies in a network is required, that reconfiguration should be performed as quickly as possible. Accordingly, a method for rapidly reconfiguring assemblies is now described. The method involves first and second assemblies. Each assembly includes a transceiver and a receiver. A retro-reflector is fixedly mounted to each assembly at a known position relative to its respective transceiver. Also, each assembly and its respective retro-reflector may face substantially in the same (e.g., FIG. 2) or different (e.g., FIG. 6) directions.

In the case where the assembly and the retro-reflector face in substantially the same directions, the method involves at least three steps. In a first step, a first electromagnetic beam is transmitted by the first assembly and a second beam from the second assembly. In a second step, the first and second beams are scanned (as described above). And, in a third step, at least a portion of the first beam is received by the first assembly when two conditions are satisfied.

One condition is satisfied when the first beam is reflected by the counterpart retro-reflector, which occurs when that retro-reflector faces in a reflectance direction. As used herein, the term "reflectance direction" means the direction that the counterpart retro-reflector faces when a beam transmitted by a transmitter is incident on and reflected by that retro-reflector. The second condition is satisfied when the first assembly faces in a linking direction. As used herein, the term "linking direction" means the direction of the first assembly when the beam reflected by the counterpart's retro-reflector is accepted by the receiver of the first assembly. Of course, these conditions are satisfied when: (1) the transmitter and receiver of the first assembly face substantially in the same direction, (2) the second retro-reflector faces the first assembly, and (3) the principal axes of the transmitter, receiver, and retro-reflector of the first assembly are substantially parallel.

In a fourth and optional step, scanning of the first beam may be terminated in response to the receiving step. By terminating scanning upon receiving, the first assembly is fixed in the linking direction. This necessarily means that the retro-reflector mounted on the first assembly faces substantially toward the second assembly. This also means that the retro-reflector is in place to reflect a beam transmitted by the second assembly back toward that second assembly.

When the first assembly faces the second assembly and receives its own reflected beam, the second assembly must be facing the first assembly. However, the second assembly may continue to scan and search for the first assembly, even though the first assembly has found the second assembly and the second assembly substantially faces the first assembly. As described above, this continued scanning may occur when the retro-reflector-transceiver separation is large, the retro-reflector and/or retro-reflector acceptance cone is small, or when the scanning beam has a small diameter or low intensity.

In order to prevent unnecessary scanning by the second assembly, the second assembly may be stopped upon notification that the first assembly has received its reflected beam. Notification could be provided by a radiowave or microwave communication link or by conventional land-based lines (e.g., optical fibers or electrical conductors). If only the approximate position of the counterpart assembly is known, the beam transmitted by that counterpart assembly may be scanned over a limited angular range that includes that approximate position. Furthermore, the beam transmitted by the counterpart assembly may be scanned using a searching routine (e.g., spiral or matrix) beginning with the reflectance direction, or the direction of the second assembly when it is notified that the first assembly has received a reflected beam.

Figure 6:
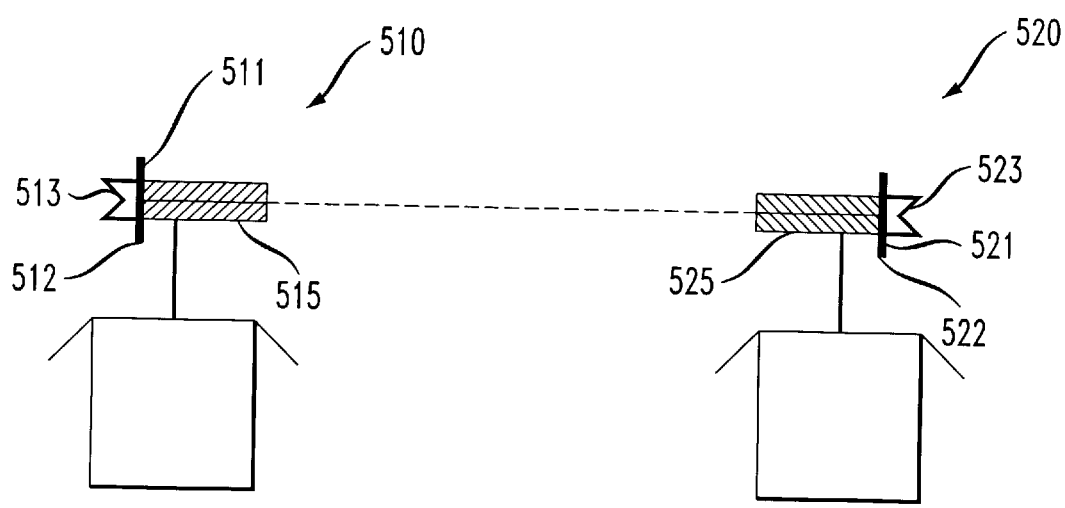
FIG. 6 is a simplified side view of yet another illustrative embodiment of two transceiver assemblies constructed in accordance with this invention.

FIG. 6 shows the case when the retro-reflector faces in a substantially different direction from the transmitter and receiver of the same assembly. This arrangement has the advantage of minimizing, if not eliminating, any stray reflected light that may otherwise reflect from a retro-reflector during communication between two assemblies. In a preferred embodiment, retro-reflector 513 of assembly 510 faces in a direction which is opposite the direction of transceiver 515 (which includes a receiver and a transmiter). Similarly, retro-reflector 523 of assembly 520 faces in a direction which is opposite the direction of transceiver 525 (which also includes a receiver and a transmitter). As shown in FIG. 6, retro-reflectors 513 and 523 may be mounted on back sides 511 and 521 of transceivers 515 and 525, respectively. Preferably, the retro-reflector is positioned such that a beam incident on it will also be incident on the transceiver of the same assembly upon rotation. Moreover, safety bonnets 512 and 522 may be sandwiched between their respective transceivers 515 and 525 and retro-reflectors 513 and 523.

A method for using the assemblies shown in FIG. 6 includes: (1) orienting the second retro-reflector to face substantially in the direction of the first transmitter; (2) scanning a first electromagnetic beam transmitted from the first assembly; (3) receiving at least a portion of the first beam by the first transceiver assembly (e.g., first receiver) when the first beam is reflected by the second retro-reflector; (4) terminating the scanning in response to the receiving; (5) rotating the second assembly so that the second transmitter and the second receiver face substantially in the direction of the first assembly and the second retro-reflector faces in a direction which is not in the direction of the first assembly (e.g., such as in an opposite direction); (6) searching for the first beam with the second receiver until the second receiver receives the first electromagnetic beam; and (7) adjusting at least one of the directions of the first transmitter and the second receiver to maximize the beam intensity received at the second receiver.

In either case, once the two assemblies are at least partially aligned, the method may further include the step of monitoring the intensity of a beam transmitted by a counterpart assembly and orienting one or both of the assemblies, or its constituent components, until the intensities of the beams at the receivers are optimized. As described above, quadrant detectors may also be used to center the beams on the receivers.

According to this invention, the step of transmitting may include modulating the intensity of one or both beams at a known frequency or a pseudo-random pattern. By modulating the beam emitted by the first assembly, the receiver of the second assembly can be programmed to listen or search only for that frequency. In this way, a searching assembly that has received a beam of light can determine whether the light is the desired modulated beam or some undesirable source of light. For example, during reconfiguration of a crowded network, more than one assembly may be searching for a mate assembly. By programming two assemblies to transmit and receive only a specific modulation frequency, proper pairing can be assured.

Alternatively, when crowding or stray light is not a factor, all scanning assemblies may transmit and receive beams modulated at a single frequency, such as 40 Hz. During scanning, the first and second beams may be scanned simultaneously or alternately, continuously or periodically, and optionally or over a limited angular range. That range may be at least partially determined using a global positioning system located near or at the assemblies and supplied to a common control unit. Scanning of an assembly can be initiated remotely or locally when the intensity of a received beam is below a predetermined level.

Interference between two or more beams may be a problem when a transmitter and a receiver of the same assembly operate at the same wavelength. For example, interference may occur because stray light from a transmitted beam may be reflected toward the receiver of the same assembly. When the wavelengths of the transmitted and reflected beams are the same, wavelength-sensitive filters are not effective in removing reflected light. However, when an assembly transmits and receives light beams having different wavelengths (even along a common optical path), wavelength-sensitive filters may be used to prevent interference at the receiver. If the transmitter and receiver use beams having the same wavelength, a common optical path may be used but those beams should be distinguishable by some other filterable characteristic, such as polarization.

Figure 5B:
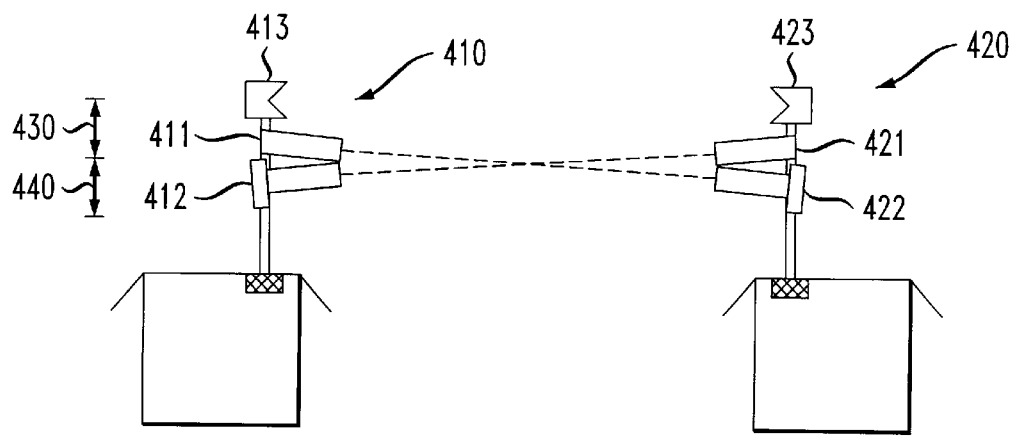
FIG. 5B is a side view of another illustrative embodiment of two transceiver assemblies constructed in accordance with this invention.

Therefore, in order to ensure minimum interference, a receiver and transmitter of a single assembly may be physically separated, as shown in FIG. 5B. FIG. 5B shows transceiver assembly 400, which includes transmitter 411, receiver 412, and retro-reflector 413, and transceiver assembly 420, which includes transmitter 421, receiver 422, and retro-reflector 423. During bi-directional communication between transceivers 410 and 420, as shown in FIG. 5B, transmitter 411 communicates with receiver 422 and transmitter 421 communicates with receiver 412. Because transmitter 411 and receiver 412 of assembly 410 are physically separated by distance 440, interference due to stray light at receiver 412 is reduced. Also, as discussed above, interference at receiver 412 can be reduced by making distance 430, which extends between retro-reflector 413 and receiver 412, sufficiently large. Therefore, when a transmitter, receiver, and retro-reflector of a single assembly are physically separated, interference is substantially eliminated.

It will be understood that the foregoing is only illustrative of the principles of the invention, and that various modifications can be made by those skilled in the art without departing from the scope and spirit of the invention. For example, retro-reflector 220, shown in FIG. 4, is not necessarily located above transceiver safety bonnet 231a. Alternatively, retro-reflector 220 may be arranged inside outer edge 232 of safety bonnet 231a, as long as the size of retro-reflector 220 is made sufficiently small or the size of the safety bonnet 231a is made sufficiently large, to accommodate such an arrangement.

What is claimed is:

1. A method of aligning a first optical transceiver assembly and a second optical transceiver assembly for communication therebetween in a free-space optical network, said method comprising:
   providing a retro-reflector at a known relative position from said second assembly, said retro-reflector being in a line-of-sight of said first assembly;
   transmitting an electromagnetic beam from said first assembly in a search sector for locating said retro-reflector;
   receiving at least a portion of said beam by said first assembly when said retro-reflector is located;
   orienting at least one of said assemblies in response to said receiving so that said assemblies are at least partially aligned; and
   said sector is a limited angular range;
   said scanning is performed in three-dimensions;
   said scanning comprises scanning according to a programmed search routine selected from a group consisting of a spiral routine, a matrix routine, or a combination thereof.

2. A method of aligning a first optical transceiver assembly and a second optical transceiver assembly for communication therebetween in a free-space optical network, said method comprising:
   providing a retro-reflector at a known relative position from said second assembly, said retro-reflector being in a line-of-sight of said first assembly;
   transmitting an electro-magnetic beam from said first assembly in a search sector for locating said retro-reflector;
   receiving at least a portion of said beam by said first assembly when said retro-reflector is located;
   orienting at least one of said assemblies in response to said receiving so that said assemblies are at least partially aligned; and
   scanning said beam in said sector for locating said retro-reflector until said receiving;
   each of said transceiver assemblies having a safety mode and a communication mode, wherein said scanning comprises:
      activating said safety mode of said first transceiver assembly so that said beam has a maximum intensity and a minimum angular velocity until said receiving;
      deactivating said safety mode of said first transceiver assembly in response to said receiving; and
      activating said communication mode of said first transceiver assembly.

3. A method of aligning a first optical transceiver assembly and a second optical transceiver assembly for communication therebetween in a free-space optical network, said method comprising:
   providing a retro-reflector at a known relative position from said second assembly, said retro-reflector being in a line-of-sight of said first assembly;
   transmitting an electromagnetic beam from said first assembly in a search sector for locating said retro-reflector;
   receiving at least a portion of said beam by said first assembly when said retro-reflector is located;
   orienting at least one of said assemblies in response to said receiving so that said assemblies are at least partially aligned;
   each of said transceiver assemblies having a safety mode and a communication mode, said method further comprising:

activating said communication mode of said first assembly;

monitoring any physical motion in a region with a motion detector positioned near said second assembly;

receiving a signal from said motion detector when said motion detector detects motion in said region; and deactivating said communication mode of said first assembly.

4. The method of claim 3 wherein said monitoring comprises monitoring said region that is adjacent to said second assembly.

5. A method of aligning a first optical transceiver assembly and a second optical transceiver assembly for communication therebetween in a free-space optical network, said method comprising:

providing a retro-reflector at a known relative position from said second assembly, said retro-reflector being in a line-of-sight of said first assembly;

transmitting an electro-magnetic beam from said first assembly in a search sector for locating said retro-reflector;

receiving at least a portion of said beam by said first assembly when said retro-reflector is located;

orienting at least one of said assemblies in response to said receiving so that said assemblies are at least partially aligned;

said second assembly comprising a safety bonnet, said method further comprising preventing said beam, when directed substantially toward said second assembly, from propagating substantially beyond said second assembly with said bonnet.

6. The method of claim 5 wherein said providing is for preventing said beam from propagating substantially beyond said second transceiver assembly when said first transceiver assembly is in said communication mode.

7. A method for rapidly reconfiguring a first optical transceiver assembly and a second optical transceiver assembly for communication therebetween in a free-space optical network, each of said assemblies having a transmitter, a receiver, and a retro-reflector fixedly mounted at a known position relative to said receiver, wherein said transmitter, said receiver, and said retro-reflector of said first assembly always point substantially in a first variable direction, and wherein said transmitter, said receiver and said retro-reflector of said second assembly always point substantially in a second variable direction, said method comprising:

orienting said first retro-reflector to reflect a beam transmitted by said second transmitter back toward said second receiver;

orienting said second retro-reflector to reflect a beam transmitted by said first transmitter back toward said first receiver;

transmitting a test pattern from said first transmitter and receiving said pattern by said first receiver to confirm that said assemblies are properly matched;

reorienting said first transmitter toward said second receiver and reorienting said second transmitter toward said first receiver said reorienting including:
    measuring a flight time between the first and second assemblies before said reorienting; and
    determining a distance between said assemblies.

8. The method of claim 7 wherein said reorienting comprises adjusting an elevation angle of said first transmitter until said second receiver receives a maximum signal.

* * * * *